United States Patent
Li et al.

(10) Patent No.: US 12,277,023 B1
(45) Date of Patent: Apr. 15, 2025

(54) POWER SUPPLY CONTROL METHOD AND APPARATUS FOR SERVER, AND POWER SUPPORT UNIT OF SERVER

(71) Applicant: Suzhou MetaBrain Intelligent Technology Co., Ltd., Jiangsu (CN)

(72) Inventors: Jianyu Li, Jiangsu (CN); Deyang Hua, Jiangsu (CN); Lingyan Wang, Jiangsu (CN); Dongyu Zhang, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/858,056

(22) PCT Filed: Jun. 27, 2023

(86) PCT No.: PCT/CN2023/102894
§ 371 (c)(1),
(2) Date: Oct. 18, 2024

(87) PCT Pub. No.: WO2024/131008
PCT Pub. Date: Jun. 27, 2024

(30) Foreign Application Priority Data

Dec. 23, 2022 (CN) .......................... 202211660007.7

(51) Int. Cl.
*G06F 1/00* (2006.01)
*G06F 1/30* (2006.01)
*G06F 1/3296* (2019.01)

(52) U.S. Cl.
CPC .............. *G06F 1/3296* (2013.01); *G06F 1/30* (2013.01)

(58) Field of Classification Search
CPC .................................. G06F 1/30; G06F 1/3296
See application file for complete search history.

(56) References Cited

U.S. PATENT DOCUMENTS

2008/0294916 A1    11/2008    Moussaoui
2015/0245531 A1    8/2015     Meinecke et al.
(Continued)

FOREIGN PATENT DOCUMENTS

CN    110518564 A    11/2019
CN    111475008 A    7/2020
(Continued)

OTHER PUBLICATIONS

International Search Report cited in PCT/CN2023/102894, mailed Sep. 20, 2023, 6 pages.
(Continued)

*Primary Examiner* — Nitin C Patel
(74) *Attorney, Agent, or Firm* — Cooper Legal Group, LLC

(57) ABSTRACT

Embodiments of the present application provide a power supply control method and apparatus of a server, and a power support unit of a server. The method includes: obtaining a target power supply power of a server to be powered; selecting, from a plurality of voltage converters deployed in a power support unit, one or more target voltage converters matched with the target power supply power; and controlling the one or more target voltage converters to supply power to the server, wherein each target voltage converter is configured for converting a power supply voltage of a power supply into a power supply voltage of the server. According to the present application, the problem in related art of low power supply efficiency of the power support unit can be solved, and the effect of improving the power supply efficiency of the power support unit is achieved.

20 Claims, 5 Drawing Sheets

(56) References Cited

U.S. PATENT DOCUMENTS

2020/0210304 A1* 7/2020 Wang .................. G06F 11/0706
2020/0341526 A1* 10/2020 Hu ........................ G06F 1/3206
2022/0317752 A1* 10/2022 Hartwell ............. G06F 11/2015

FOREIGN PATENT DOCUMENTS

| | | |
|---|---|---|
| CN | 113489290 A | 10/2021 |
| CN | 115085510 A | 9/2022 |
| CN | 115129135 A | 9/2022 |
| CN | 115629664 A | 1/2023 |
| WO | 2019120595 A1 | 6/2019 |

OTHER PUBLICATIONS

Written Opinion cited in PCT/CN2023/102894, mailed Sep. 20, 2023, 10 pages.
Notification to Grant Patent Right for Invention cited in CN202211660007.7, mailed Mar. 1, 2023, 3 pages.
First Office Action cited in CN202211660007.7, mailed Feb. 6, 2023, 8 pages.

\* cited by examiner

POWER SUPPLY CONTROL METHOD AND APPARATUS FOR SERVER, AND POWER SUPPORT UNIT OF SERVER

CROSS-REFERENCE TO RELATED APPLICATION

This application claims priority to Chinese Patent Application No. 202211660007.7, entitled "POWER SUPPLY CONTROL METHOD AND APPARATUS FOR SERVER, AND POWER SUPPORT UNIT OF SERVER" filed with the China National Intellectual Property Administration on Dec. 23, 2022, which is incorporated herein by reference in its entirety.

FIELD

Embodiments of the present application relate to the field of computers, and in particular, to a power supply control method and apparatus for a server, and a power support unit of a server.

BACKGROUND

With the rapid growth of the social economy, the data center industry is flourishing globally and will have a large development space in many cities in the future, with an increasing number of large data centers. As an important device in a data center that provides computation and storage of data, servers are highly regarded for their reliable and efficient operation. With the increase of demands, there are more and more services that need to be executed by servers. Therefore, servers with various service functions have emerged. Since services executed by the servers are different, the servers have different power levels. Therefore, to ensure the functions of the servers, it is usually necessary to set corresponding server power support units (PSUs) for the types of the services of the servers. The PSUs are used to supply power to the servers, thereby meeting the demands of the servers for power supply powers. However, in this method, the power support units need to be configured separately for the servers, which makes it difficult to achieve uniformity of the power support units of the servers and is not conducive to the expansion and maintenance of power supplies of the servers. Moreover, the same kind of power support unit can only supply power to a server with a specific service function, resulting in poor adaptability and low power supply efficiency.

SUMMARY

The embodiments of the present application provide a power supply control method and apparatus for a server, and a power support unit of a server, to at least solve the problem of low power supply efficiency of the power support unit in the related art.

According to one embodiment of the present application, a power supply control method for a server is provided, including: obtaining a target power supply power of a server to be powered; selecting, from a plurality of voltage converters deployed in a power support unit, one or more target voltage converters matched with the target power supply power, wherein the plurality of voltage converters in the power support unit are deployed in parallel; the power support unit is connected between a power supply of the server and the server; and controlling the one or more target voltage converters to supply power to the server, wherein each target voltage converter is configured for converting a power supply voltage of the power supply into a power supply voltage of the server.

Optionally, the selecting, from a plurality of voltage converters deployed in a power support unit, one or more target voltage converters matched with the target power supply power includes: obtaining a full-load power that is allowed to be output by each voltage converter; and selecting, from the plurality of voltage converters according to the full-load powers, the one or more target voltage converters allowed to output the target power supply power, wherein a total power that is allowed to be output by the one or more target voltage converters is greater than or equal to the target power supply power.

Optionally, the selecting, from the plurality of voltage converters according to the full-load powers, the one or more target voltage converters allowed to output the target power supply power includes: converting the full-load power into operating power according to a target power conversion rate, wherein the target power conversion rate is a power conversion rate needing to be achieved by each target voltage converter; calculating a target number according to the target power supply power and the operating power; and obtaining the target number of target voltage converters from the plurality of voltage converters.

Optionally, the converting the full-load power into operating power according to a target power conversion rate includes: searching a target conversion rate corresponding the target power conversion rate from the power conversion rate and conversion ratio having a corresponding relationship; and determining a product of the full-load power and the target conversion ratio as the operating power.

Optionally, the converting the full-load power into operating power according to a target power conversion rate includes: in a case that the target power conversion rate is a maximum conversion rate that the target voltage converter is allowed to achieve, determining a half-load power corresponding to the full-load power as the operating power.

Optionally, the calculating a target number according to the target power supply power and the operating power includes: calculating a ratio of the target power supply power to the operating power; in a case that the ratio is an integer, determining the ratio as the target number; and in a case that the ratio is a non-integer, rounding the ratio up to an integer, and obtaining the target number.

Optionally, the controlling the one or more target voltage converters to supply power to the server includes: sending a target enable signal to each target voltage converter, wherein the target enable signal is used for controlling the target voltage converter to operate; and controlling a switching device between each target voltage converter and the server to be closed.

Optionally, the controlling a switching device between each target voltage converter and the server to be closed includes: controlling a field effect transistor between each target voltage converter and the server to be turned on, wherein the switching device includes the field effect transistor; and controlling a field effect transistor between each reference voltage converter and the server to be turned off, wherein the reference voltage converter is a voltage converter among the plurality of voltage converters except the one or more target voltage converters.

Optionally, after the controlling the one or more target voltage converters to supply power to the server, the method further includes: detecting an operating state of the target voltage converter, wherein the operating state includes a normal operating state and an abnormal operating state; in a case of detecting that the target voltage converter is in the abnormal operating state, selecting a replacement voltage converter from candidate voltage converters, wherein the candidate voltage converters are voltage converters among the plurality of voltage converters except the target voltage converter; and controlling the replacement voltage converter to supply power to the server, and controlling the target voltage converter in the abnormal operating state to stop operating.

Optionally, the obtaining a target power supply power of a server to be powered includes: obtaining a service load of a target service to be executed by the server; and predicting the target power supply power of the server according to the service load.

Optionally, the predicting the target power supply power of the server according to the service load includes: inputting the service load to a target power prediction model, wherein the target power prediction model is obtained by training an initial power prediction model by using a power consumed by executing a reference service by the server, and the reference service includes the target service; and obtaining consumed power, which is output by the target power prediction model, as the target power supply power.

According to another embodiment of the present application, a power support unit of a server is provided, including: a plurality of voltage converters and a processing chip, wherein the plurality of voltage converters are deployed in parallel; the processing chip is connected to each voltage converter; the power support unit is connected between a power supply of a server to be powered and the server; the processing chip is configured for: obtaining a target power supply power of the server; selecting, from the plurality of voltage converters, one or more target voltage converters matched with the target power supply power; and controlling the one or more target voltage converters to supply power to the server; and each target voltage converter is configured for converting a power supply voltage of the power supply into a power supply voltage of the server.

Optionally, the processing chip is connected to an enable port of each voltage converter; each target voltage converter is connected to the server through a switching device; the processing chip is connected to each switching device separately; and the processing chip is configured for: sending a target enable signal to the enable port of each target voltage converter, wherein the target enable signal is used for controlling the target voltage converter to operate; and controlling the switching device between each target voltage converter and the server to be closed.

Optionally, a target power prediction model is further deployed in the processing chip; and the processing chip is configured for: obtaining a service load of a target service to be executed by the server; inputting the service load to the target power prediction model, wherein the target power prediction model is obtained by training an initial power prediction model by using a power consumed by executing a reference service by the server, and the reference service includes the target service; and obtaining consumed power, which is output by the target power prediction model, as the target power supply power.

Optionally, the power support unit further includes: a plurality of fuses, wherein the plurality of fuses are arranged in a manner of corresponding to the plurality of voltage converters; first ends of the fuses are connected to the power supply, and second ends of the fuses are connected to input ends of the voltage converters; and the fuses are configured for cutting off the connection between the power supply and the voltage converters in a case that a broken circuit fault occurs in the voltage converters.

Optionally, the power support unit further includes: a filtering module, wherein a first end of the filtering module is connected to the power supply, and a second end of the filtering module is connected to input ends of the plurality of voltage converters; and the filtering module is configured for filtering out noise output by the power supply.

Optionally, the power support unit further includes: a correction module, wherein a first end of the correction module is connected to the power supply, and a second end of the correction module is connected to input ends of the plurality of voltage converters; and the correction module is configured for adjusting phases of voltage and current input to the voltage converters to obtain an input voltage and input current which have the same phases.

According to another embodiment of the present application, a power supply control apparatus for a server is provided, including: an obtaining module, configured for obtaining a target power supply power of a server to be powered; a first selection module, configured for selecting, from a plurality of voltage converters deployed in a power support unit, one or more target voltage converters matched with the target power supply power, wherein the plurality of voltage converters in the power support unit are deployed in parallel; the power support unit is connected between a power supply of the server and the server; and a first control module, configured for controlling the one or more target voltage converters to supply power to the server, wherein each target voltage converter is configured for converting a power supply voltage of the power supply into a power supply voltage of the server.

According to still another embodiment of the present application, a non-volatile computer-readable storage medium is further provided. The computer-readable storage medium has a computer program stored thereon, and the computer program is configured for, when run, executing the steps in any one of the above method embodiments.

According to yet still another embodiment of the present application, an electronic device is further provided, including a memory and a processor. The memory has a computer program stored thereon. The processor is configured for running the computer program to execute the steps in any one of the above method embodiments.

Through the present application, a plurality of voltage converters are deployed in the power support unit; and the plurality of voltage converters are deployed in parallel. After a target power supply power of a server to be powered is obtained, one or more target voltage converters matched with the target power supply power are selected from the plurality of voltage converters according to the target power supply power, and the one or more selected target voltage converters are then controlled to supply power to the server, thereby satisfying the target power supply power of the server, namely, the power supply power of the server is satisfied by flexibly selecting the voltage converters for supplying power to the server, whereby the same power support unit can supply power to servers with different demands for the power supply power. Therefore, the problem of low power supply efficiency of the power support unit in the related art can be solved, and the effect of improving the power supply efficiency of the power support unit can be achieved.

DETAILED DESCRIPTION

The embodiments of the present application will be described in detail below with reference to the accompanying drawings and the embodiments.

It should be noted that the terms "first", "second", etc. in the specification and claims of the present disclosure and the above accompanying drawings are defined to distinguish similar objects, and do not have to be used to describe a specific order or sequence.

Figure 1:
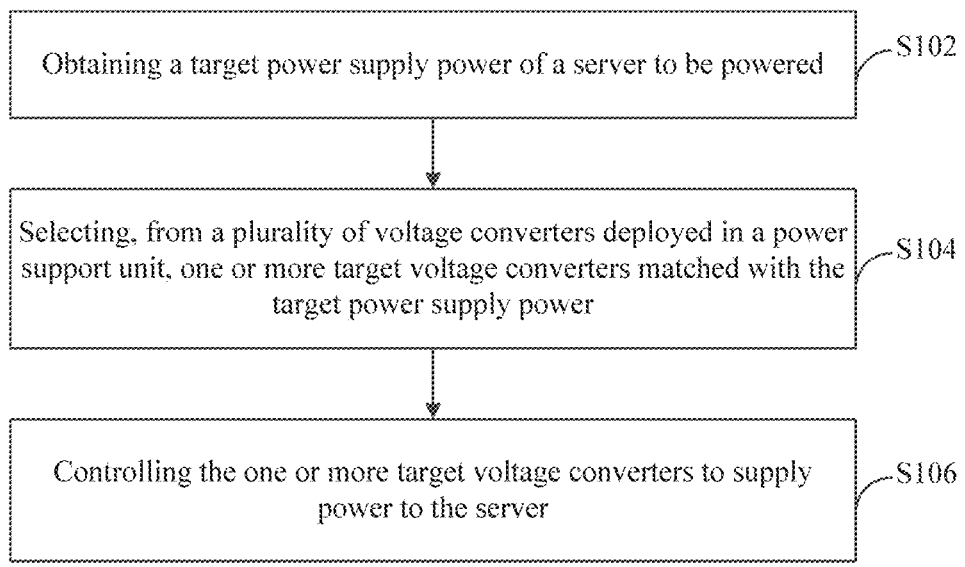
FIG. 1 is a flowchart of a power supply control method for a server according to an embodiment of the present application.

FIG. 1 is a flowchart of a power supply control method for a server according to an embodiment of the present application. As shown in FIG. 1, the flow includes the following steps:

Step S102, obtaining a target power supply power of a server to be powered;

Step S104, selecting, from a plurality of voltage converters deployed in a power support unit, one or more target voltage converters matched with the target power supply power, wherein the plurality of voltage converters in the power support unit are deployed in parallel; the power support unit is connected between a power supply of the server and the server; and Step S106, controlling the one or more target voltage converters to supply power to the server, wherein each target voltage converter is configured for converting a power supply voltage of the power supply into a power supply voltage of the server.

Through the above steps, a plurality of voltage converters are deployed in the power support unit; and the plurality of voltage converters are deployed in parallel. After a target power supply power of a server to be powered is obtained, one or more target voltage converters matched with the target power supply power are selected from the plurality of voltage converters according to the target power supply power, and the one or more selected target voltage converters are then controlled to supply power to the server, thereby satisfying the target power supply power of the server, namely, the power supply power of the server is satisfied by flexibly selecting the voltage converters for supplying power to the server, whereby the same power support unit can supply power to servers with different demands for the power supply power. Therefore, the problem of low power supply efficiency of the power support unit in the related art can be solved, and the effect of improving the power supply efficiency of the power support unit can be achieved.

In the embodiment provided in Step S102 above, the target power supply power can be predicted according to service information of a service to be executed by the server to be powered. Namely, during execution of different services, the power required by the server to execute different services is different (for example, for execution of data operation services, as computational loads are different, the power consumed is also different). Thus, the power supply power required by the server can be predicted according to the service information of the service to be executed by the server. The service information is used for reflecting a service load of the service to be executed (which can include but not limited to a service type, a service volume/a load, and the like).

Optionally, in this embodiment, the target power supply power can alternatively be identified from a power supply request sent by the server, and the power supply request is generated by the server according to a service requirement during the execution of the service.

In the embodiment provided in Step 104 above, the selection of the target voltage converters can be: selecting voltage converters from the plurality of voltage converters as the target voltage converters, wherein a total output power of the selected voltage converters can satisfy the target power supply power. For example, if the target power supply power is 1000 W, a voltage converter with an output power greater than or equal to 1000 W can be selected from the plurality of voltage converters as a target voltage converter (i.e., a voltage converter with a full-load output power of 1000 W, 1100 W, 1200 W, or the like is selected as the target voltage converter). Or, a plurality of voltage converters can be selected as the target voltage converters, wherein a sum of full-load output powers of the selected voltage converters can satisfy the target power supply (For example, two voltage converters with the full-load power of 500 W are selected from the plurality of voltage converters as the target voltage converters, or a voltage converter with the full-load power of 400 W and a voltage converter with the full-load power of 600 W are selected as the target voltage converters), thereby satisfying the target power supply required by the server. The present application does not limit this.

Optionally, in this embodiment, the voltage converters may alternatively be selected according to power conversion rates of the voltage converters. To be specific, in addition to meeting a target power supply requirement of the server, the target voltage converters can output power according to a specified target power conversion rate. For example, after a target power conversion rate of the voltage converters is determined, power conversion rates and conversion ratios having correspondence relationships with the power conversion rates are first searched for a target conversion ratio corresponding to the target power conversion rate, and a product of the full-load power and the target conversion ratio of the voltage converter is determined as an actual operating power of each voltage converter, and a desired number of target voltage converters is determined according to the target power supply power and the operating power, thereby selecting a target number of voltage converters from the plurality of voltage converters as the target voltage converters. The target number of voltage converters operate in a manner of outputting the operating power, whereby the total power output by the target number of voltage converters can satisfy the target power supply power, and the power conversion rate of the voltage converters is the target power conversion rate.

Optionally, in this embodiment, the number of the plurality of voltage converters deployed in the power support unit is greater than or equal to the number of actually used target voltage converters. After the target voltage converters are found, reference voltage converters among the plurality of voltage converters except the target voltage converters can be used as backup voltage converters. If a target voltage converter fails, a voltage converter can be selected from the reference voltage converters to replace the failed target voltage converter.

Optionally, in this embodiment, the voltage converters may include, but not limited to, a Direct Current-Direct Current (DC-DC) converter and an Alternating Current-Direct Current (AC-DC) converter.

In the embodiment provided in Step S106 above, the method for controlling the target voltage converters to supply power to the server may include but is not limited to: sending an enable signal to the target voltage converters, or controlling control switches connected between the voltage converters and the server to be in a connected state, to make connect the voltage converters to the server.

As an optional embodiment, the selecting, from a plurality of voltage converters deployed in a power support unit, one or more target voltage converters matched with the target power supply power includes:

obtaining a full-load power that is allowed to be output by each voltage converter; and selecting, from the plurality of voltage converters according to the full-load powers, the one or more target voltage converters allowed to output the target power supply power, wherein a total power that is allowed to be output by the one or more target voltage converters is greater than or equal to the target power supply power.

Optionally, in this embodiment, the full-load power is a maximum output power of the voltage converter. After a sampling circuit acquires a voltage or current output by the voltage converter, the full-load power of the voltage converter can be determined according to the output voltage or current. Or, a model number of a voltage converter can be obtained, and the full-load power of the voltage converter with this model number can be then determined.

Optionally, in this embodiment, when one target voltage converter is selected from the plurality of voltage converters, the full-load power of the target voltage converter is greater than or equal to the target power supply power. When a plurality of target voltage converters are selected from the plurality of voltage converters, a sum of the full-load powers of the plurality of target voltage converters is greater than or equal to the target power supply power. Moreover, the selected target voltage converters have the same or different full-load powers. This scheme does not limit this.

As an optional embodiment, the selecting, from the plurality of voltage converters according to the full-load powers, the one or more target voltage converters allowed to output the target power supply power includes: converting the full-load power into operating power according to a target power conversion rate, wherein the target power conversion rate is a power conversion rate needing to be achieved by each target voltage converter; calculating a target number according to the target power supply power and the operating power; and obtaining the target number of target voltage converters from the plurality of voltage converters.

Optionally, in this embodiment, the power conversion rate is used for indicating the efficiency of converting, by the voltage converter, electric energy input to the voltage converter into electric energy input to the server. For the same target voltage converter, the power conversion rate of the target voltage converter varies depending on different power outputs.

Through the above steps, the operating power of each target voltage converter is determined according to the target power conversion rate, whereby the number of the required target voltage converters can be determined according to the target power supply power and the operating power, thereby achieving the purpose of supplying power to the server through the target number of target voltage converters. The power conversion rate of each voltage converter is the target power conversion rate, thus ensuring the controllability of the power conversion rate of the power support unit while ensuring the demand for the server for the power supply power.

As an optional embodiment, the converting the full-load power into operating power according to a target power conversion rate includes:

searching power conversion rates and conversion ratios having correspondence relationships with the power conversion rates for a target conversion ratio corresponding to the target power conversion rate; and determining a product of the full-load power and the target conversion ratio as the operating power.

Optionally, in this embodiment, a conversion ratio is a ratio of an actual operating power of a voltage converter to the full-load power of the voltage converter.

As an optional embodiment, the converting the full-load power into operating power according to a target power conversion rate includes:

in a case that the target power conversion rate is a maximum conversion rate that the target voltage converter is allowed to achieve, determining a half-load power corresponding to the full-load power as the operating power.

Optionally, in this embodiment, when the output power of the voltage converter is a half-load power (i.e. half of the full-load power), the power conversion rate of the voltage converter is maximized. Therefore, in a case that the target conversion rate is the maximum conversion rate, the half-load power corresponding to the full-load power is determined as the operating power, thereby ensuring the maximum power conversion rate of the power support unit.

Figure 2:
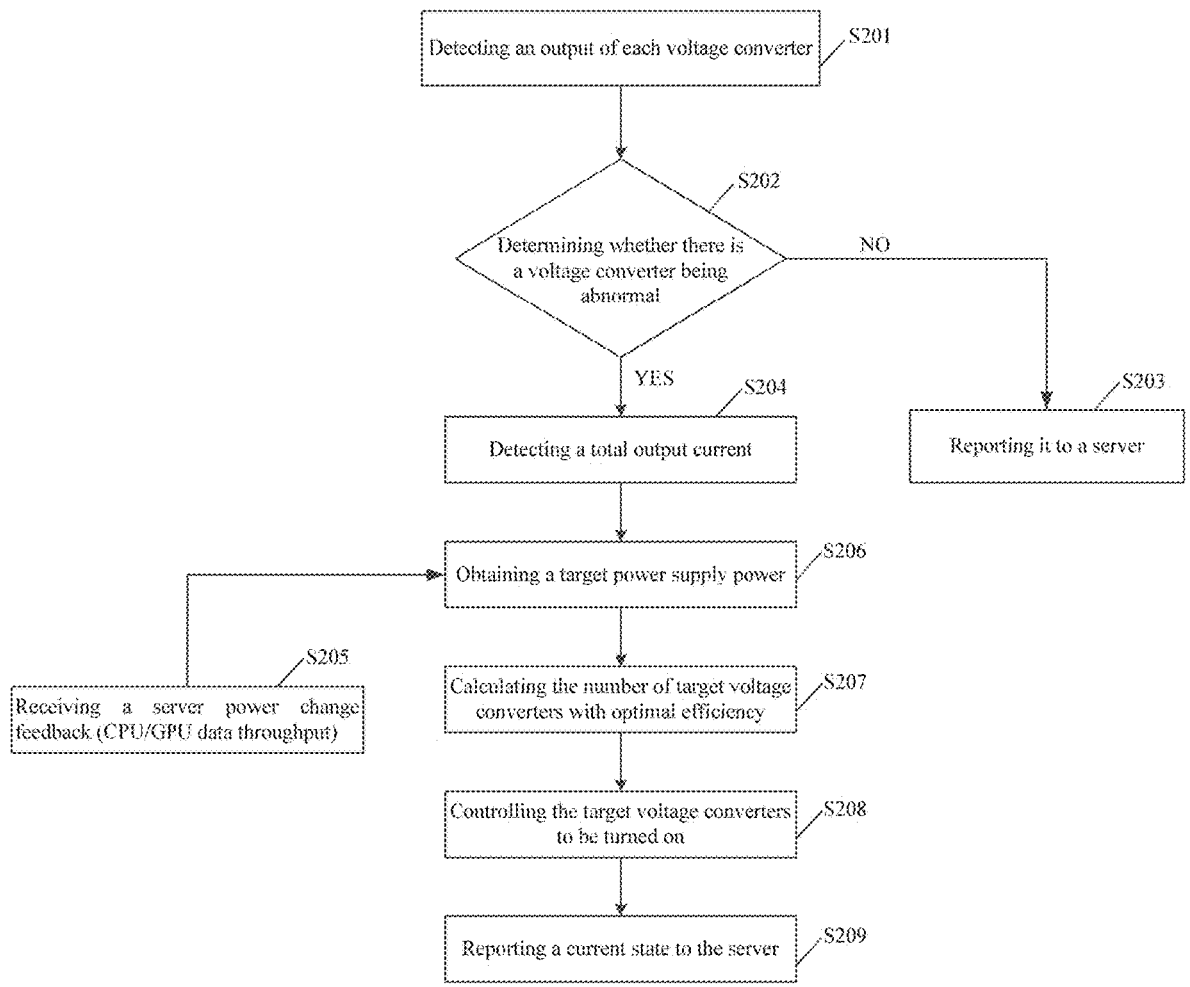
FIG. 2 is a control flowchart of an optional voltage converter according to an embodiment of the present application.

FIG. 2 is a control flowchart of an optional voltage converter according to an embodiment of the present application. As shown in FIG. 2, the flow at least includes the following steps:

S201, when a power support unit is powered on, starting initialization, wherein by sending a control signal to a plurality of voltage converters deployed in the power support unit, the plurality of voltage converters are powered on normally. Meanwhile, every preset time, an output voltage sampling circuit detects an output voltage of each voltage converter. Moreover, in conjunction with information, fed back by a power management unit of a server, of a service that has been already run on the server, such as an operating state of a Central Processing Unit (CPU) or a Graphics Processing Unit (GPU) on a server board, a relationship between a service state of the server and a power used is determined as a training sample. The training sample is used for training an initial power prediction model.

S202, according to the voltage output by each voltage converter and acquired by the sampling circuit, determining whether each voltage converter is normal; if yes, executing Step S204; and if no, executing step S203.

S203, reporting an abnormal state of the voltage converter to a mainboard power management unit of the server for processing through I2C communication.

S204, detecting an output current through an output current sampling circuit, obtaining an output current of each voltage converter, and then obtaining full-load power of each voltage converter.

S205, receiving a server power change feedback (CPU/GPU data throughput), wherein the feedback is used for indicating service information (such as a load) of a target service to be executed by the server.

S206, predicting service information through a target power prediction model, thereby predicting a target power supply power required by the server to execute a target service, wherein the target power prediction model is obtained by training the initial power prediction model by using the training sample.

S207, dividing the target power supply power by half of the full-load power of a single voltage converter to obtain an optimal target number calculated if each voltage converter operates at about the half-load power, wherein at this time, the target voltage converter operates at its most efficient operating point.

S208, controlling enable ends of the corresponding number of target voltage converters and switching devices at output ends of the corresponding target voltage converters to be turned on, and turning off enable ends of the remaining voltage converters and the switching devices at output ends of the corresponding voltage converters, wherein the overall efficiency of the PSU can be effectively improved according to this control policy.

S209, reporting, in real time, a state corresponding to the power support unit to the power management system of the server, facilitating a server system to learn the current operating state of the power support unit in real time and make some work plans.

Through the above steps, the plurality of voltage converters deployed in the power support unit can be controlled to maintain the most efficient state during the operation of the server, thereby effectively improving the overall efficiency of the system.

As an optional embodiment, the calculating a target number according to the target power supply power and the operating power includes:
calculating a ratio of the target power supply power to the operating power;
in a case that the ratio is an integer, determining the ratio as the target number; and
in a case that the ratio is a non-integer, rounding the ratio up to an integer, and obtaining the target number.

Optionally, in this embodiment, the ratio of the target power supply power to the operating power represents the number of voltage converters required to ensure the demand for the target power supply power when each voltage converter outputs electric energy according to this operating power.

Through the above step, since the number of voltage converters required is determined by calculating the ratio of the target power supply power to the operating power, in a case that the ratio is a non-integer, the electric energy demand of the server is ensured by rounding up to an integer.

As an optional embodiment, the controlling the one or more target voltage converters to supply power to the server includes:
sending a target enable signal to each target voltage converter, wherein the target enable signal is used for controlling the target voltage converter to operate; and
controlling a switching device between each target voltage converter and the server to be closed.

Optionally, in this embodiment, the switching device is a device that has a function of controlling connection and disconnection between a voltage converter and the server. The switching device may include, but is not limited to a control switch, a field effect transistor, and the like. This scheme does not limit this.

Through the above steps, the switching device is arranged between each voltage converter and the server. If each target voltage converter needs to be controlled to supply power to the server, the target enable signal needs to be sent to the target voltage converter, thereby controlling the target voltage converter to operate, and controlling the switching device between the target voltage converter and the server to be closed to form a path. Namely, the switching device is opened when the voltage converter is not used, thereby avoiding the impact of the current output by the target voltage converter connected in parallel on a voltage converter that is in a non-operating state.

As an optional embodiment, the controlling a switching device between each target voltage converter and the server to be closed includes:
controlling a field effect transistor between each target voltage converter and the server to be turned on, wherein the switching device includes the field effect transistor; and
controlling a field effect transistor between each reference voltage converter and the server to be turned off, wherein the reference voltage converter is a voltage converter among the plurality of voltage converters except the one or more target voltage converters.

Optionally, in this embodiment, the field effect transistor is arranged between each voltage converter and the server. A connection state between the voltage converter and the server is controlled by controlling turning on and turning off of the field effect transistor. The field effect transistor includes a source, a gate, and a drain. The source of the field effect transistor is connected to an output end of the voltage converter; the drain of the field effect transistor is connected to the server; the gate of the field effect transistor is connected to a port for sending a control signal; and the control signal is used for controlling the turning on and turning off of the field effect transistor.

As an optional embodiment, after the controlling the one or more target voltage converters to supply power to the server, the method further includes:
detecting an operating state of the target voltage converter, wherein the operating state includes a normal operating state and an abnormal operating state;
in a case of detecting that the target voltage converter is in the abnormal operating state, selecting a replacement voltage converter from candidate voltage converters, wherein the candidate voltage converters are the voltage converters among the plurality of voltage converters except the target voltage converter; and
controlling the replacement voltage converter to supply power to the server, and controlling the target voltage converter in the abnormal operating state to stop operating.

Optionally, in this embodiment, the abnormal state is used for indicating that electric energy output by the target voltage converter is abnormal, including but not limited to a short circuit, an abnormal output voltage value, an abnormal output current value, and the like. This scheme does not limit this.

Optionally, in this embodiment, the replacement voltage converter can be a voltage converter having the same full-load power as that of the failed target voltage converter, or can be a voltage converter having the full-load power greater than that of the failed target voltage converter. This scheme does not limit this.

Through this embodiment, the voltage converters among the plurality of voltage converters deployed in the power support unit except the target voltage converters are all used as candidate voltage converters. When a target voltage converter fails, a candidate voltage converter can be used to replace the failed target voltage converter, thereby achieving self-redundancy of the power support unit, avoiding the problem that the power support unit cannot be used because of the failure of the voltage converter, and improving the power supply efficiency of the power support unit.

As an optional embodiment, the obtaining a target power supply power of a server to be powered includes:
  obtaining a service load of a target service to be executed by the server; and
  predicting the target power supply power of the server according to the service load.

Optionally, in this embodiment, the method for predicting the target power supply power of the server can be: determining the target power supply power corresponding to the service load from a correspondence relationship between the service load and the power supply power having the correspondence relationship with the service load, or can be: predicting the service load by using a target power prediction model, thereby obtaining the target power supply power. The target power prediction model can be obtained by training an initial power prediction model by using a power supply power as a sample, and the power supply power is required by the server to execute a service within a historical period of time.

As an optional embodiment, the predicting the target power supply power of the server according to the service load includes:
  inputting the service load to a target power prediction model, wherein the target power prediction model is obtained by training an initial power prediction model by using a power consumed by executing a reference service by the server, and the reference service includes the target service; and
  obtaining consumed power, which is output by the target power prediction model, as the target power supply power.

Optionally, in this embodiment, the target power prediction model can be a prediction model composed of a plurality of network layers (which can include but not limited to a convolutional layer, a pooling layer, a fully connected layer, and the like). After the service load is input to the target power prediction model, the target power prediction model can output consumed power corresponding to the service load. The present application does not impose limitations on a model result of the target power prediction model.

Figure 3:
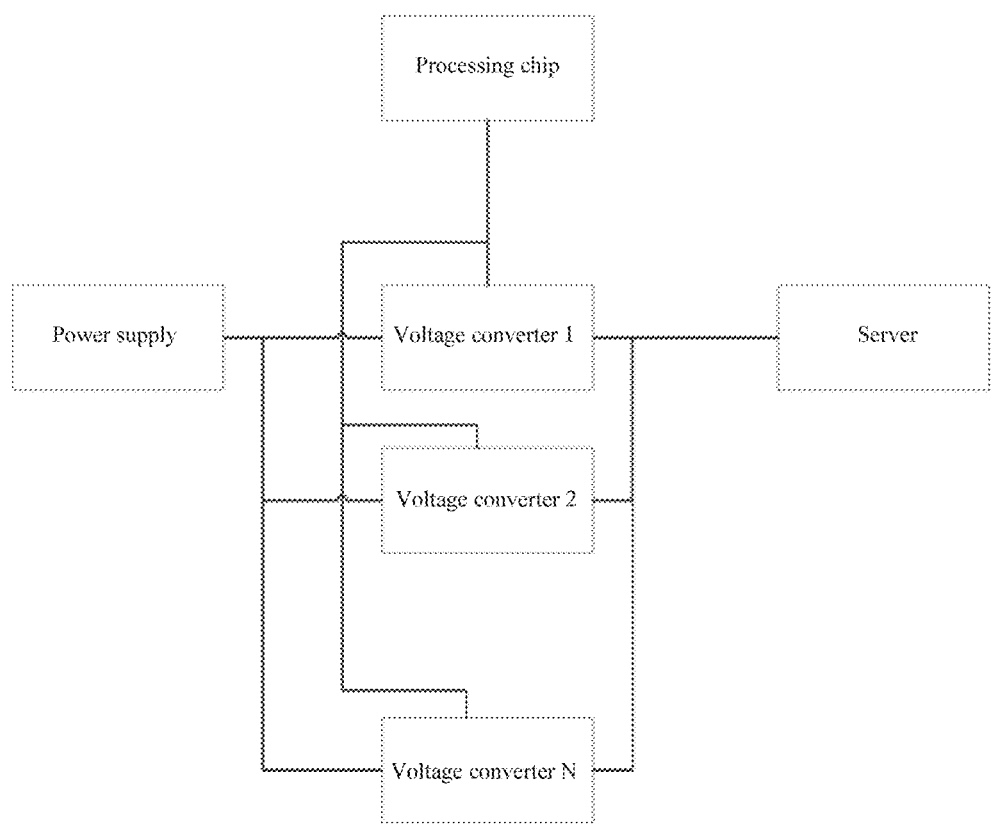
FIG. 3 is a structural diagram of a power support unit of a server according to an embodiment of the present application.

This embodiment further provides a power support unit of a server. FIG. 3 is a structural diagram of a power support unit of a server according to an embodiment of the present application. As shown in FIG. 3, the power support unit includes a plurality of voltage converters and a processing chip.

The plurality of voltage converters are deployed in parallel; the processing chip is connected to each voltage converter; the power support unit is connected between a power supply of a server to be powered and the server;
  the processing chip is configured for: obtaining a target power supply power of the server; selecting, from the plurality of voltage converters, one or more target voltage converters matched with the target power supply power; and controlling the one or more target voltage converters to supply power to the server; and
  each target voltage converter is configured for converting a power supply voltage of the power supply into a power supply voltage of the server.

Through the above content, a plurality of voltage converters are deployed in the power support unit; and the plurality of voltage converters are deployed in parallel. After a target power supply power of a server to be powered is obtained, one or more target voltage converters matched with the target power supply power are selected from the plurality of voltage converters according to the target power supply power, and the one or more selected target voltage converters are then controlled to supply power to the server, thereby satisfying the target power supply power of the server, namely, the power supply power of the server is satisfied by flexibly selecting the voltage converters for supplying power to the server, whereby the same power support unit can supply power to servers with different demands for the power supply power. Therefore, the problem of low power supply efficiency of the power support unit in the related art can be solved, and the effect of improving the power supply efficiency of the power support unit can be achieved.

Optionally, in this embodiment, the voltage converters may include, but not limited to, a Direct Current-Direct Current (DC-DC) converter and an Alternating Current-Direct Current (AC-DC) converter.

Optionally, in this embodiment, a circuit topology of each voltage converter includes but is not limited to a Logical Link Control (LLC) resonant transformation topology and a phase-shift full bridge transformation topology, and has a function of achieving level conversion. An output voltage in power factor correction is converted into a voltage required by an entry of a mainboard of the server. Meanwhile, input voltages and output voltages of n power daughter card units have the characteristic of electric isolation.

Optionally, in this embodiment, the number of the plurality of voltage converters deployed in the power support unit is greater than or equal to the number of actually used target voltage converters. After the target voltage converters are found, candidate voltage converters among the plurality of voltage converters deployed in the power support unit except the target voltage converters can be used as backup voltage converters. If a target voltage converter fails, a backup voltage converter can be used to replace the failed target voltage converter to supply power to the server.

Optionally, in this embodiment, the processing chip is a chip having a data computing and processing function and at least having the functions of obtaining the target power supply power of the server; selecting, from the plurality of voltage converters, the one or more target voltage converters matched with the target power supply power; and controlling the one or more target voltage converters to supply power to the server. In addition, the processing chip can further have functions of acquiring voltages and currents which are output by the voltage converters, predicting, according to service information of a service to be executed by the server, a power supply power required by the server, and the like.

As an optional embodiment, the processing chip is connected to an enable port of each voltage converter; each target voltage converter is connected to the server through a switching device; the processing chip is connected to each switching device separately; and
  the processing chip is configured for: sending a target enable signal to the enable port of each target voltage converter, wherein the target enable signal is used for controlling the target voltage converter to operate; and controlling the switching device between each target voltage converter and the server to be closed.

Optionally, in this embodiment, the switching device is a device that has a function of controlling connection and disconnection between a voltage converter and the server.

The switching device may include, but is not limited to a control switch, a field effect transistor, and the like. This scheme does not limit this.

Optionally, in this embodiment, the switching device corresponding to each voltage converter is further deployed in the power support unit. The switching device is arranged between the voltage converter and the server and configured for controlling a connection state between the voltage converter and the server. Since the plurality of voltage converters are connected in parallel, the arrangement of the switching devices avoids the impact of the electric energy output by the target voltage converters in operating states on the candidate voltage converters that do not operate.

As an optional embodiment, each switching device includes a field effect transistor.

The processing chip is configured for controlling the field effect transistor between each target voltage converter and the server to be turned on; and controlling the field effect transistor between each reference voltage converter and the server to be turned off, wherein the reference voltage converter is a voltage converter among the plurality of voltage converters except the one or more target voltage converters.

Optionally, in this embodiment, the field effect transistor is arranged between each voltage converter and the server. A connection state between the voltage converter and the server is controlled by controlling turning on and turning off of the field effect transistor. The field effect transistor includes a source, a gate, and a drain. The source of the field effect transistor is connected to an output end of the voltage converter; the drain of the field effect transistor is connected to the server; the gate of the field effect transistor is connected to a port for sending a control signal; and the control signal is used for controlling the turning on and turning off of the field effect transistor.

As an optional embodiment, each field effect transistor includes an N-type field effect transistor.

The processing chip is connected to a gate of the N-type field effect transistor; a source of the N-type field effect transistor is connected to the corresponding voltage converter; and a drain of the N-type field effect transistor is connected to the server.

Through the above content, the N-type field effect transistor is arranged between each voltage converter and the server; the source of the N-type field effect transistor is connected to the voltage converter; and the drain of the N-type field effect transistor is connected to the server; and the gate is connected to the processing chip. Thus, the field effect transistor is controlled to be turned on and turned off through the processing chip, to avoid the impact of the electric energy output by other target voltage converters on the candidate voltage converters.

As an optional embodiment, the processing chip is further configured for:
  detecting an operating state of the target voltage converter, wherein the operating state includes a normal operating state and an abnormal operating state;
  in a case of detecting that the target voltage converter is in the abnormal operating state, selecting a replacement voltage converter from candidate voltage converters, wherein the candidate voltage converters are voltage converters among the plurality of voltage converters except the target voltage converter; and controlling the replacement voltage converter to supply power to the server, and controlling the target voltage converter in the abnormal operating state to stop operating.

Optionally, in this embodiment, the method for controlling the replacement voltage converter to supply power to the server can be: sending an enable signal to the replacement voltage converter to make the replacement voltage converter to supply power to the server. Similarly, the method for controlling the target voltage converter in the abnormal operating state to stop operating can be: sending a disable signal to the target voltage converter in the abnormal operating state.

As an optional embodiment, a target power prediction model is further deployed in the processing chip.

The processing chip is configured for: obtaining a service load of a target service to be executed by the server; inputting the service load to the target power prediction model, wherein the target power prediction model is obtained by training an initial power prediction model by using a power consumed by executing a reference service by the server, and the reference service includes the target service; and obtaining consumed power, which is output by the target power prediction model, as the target power supply power.

Optionally, in this embodiment, the processing chip can obtain service information (which can include but not limited to a service type, a service load, and the like) of historical services executed by the server, and detect historical power supply powers consumed by the servers to execute the historical services, thereby correspondingly storing the service information of the historical services and the historical power supply powers for the training of the initial power prediction model.

As an optional embodiment, the power support unit further includes: a plurality of fuses.

The plurality of fuses are arranged in a manner of corresponding to the plurality of voltage converters; first ends of the fuses are connected to the power supply, and second ends of the fuses are connected to input ends of the voltage converters; and
  the fuses are configured for cutting off the connection between the power supply and the voltage converters in a case that a broken circuit fault occurs in the voltage converters.

Optionally, in this embodiment, the fuses are used when the voltage converters are damaged due to a short circuit fault. To avoid the impact on the normal operations of other voltage converters, a connecting circuit where the failed voltage converter is quickly fused to achieve isolation and protection on other voltage converters and to ensure the normal operation of the power support unit.

Optionally, in this embodiment, the type of the fuse used can be set according to a circuit requirement, including but not limited to a high-voltage fuse, a low-voltage fuse, and the like, or a fuse wire configured with a specific model number. This scheme does not limit this.

As an optional embodiment, the power support unit further includes: a filtering module. A first end of the filtering module is connected to the power supply, and a second end of the filtering module is connected to input ends of the plurality of voltage converters.

The filtering module is configured for filtering out noise output by the power supply.

Optionally, in this embodiment, a filter may be an Electromagnetic Interference (EMI) filter, configured for preventing high-frequency noise from the power supply from affecting a power grid.

As an optional embodiment, the power support unit further includes: a correction module. A first end of the correction module is connected to the power supply, and a second end of the correction module is connected to input ends of the plurality of voltage converters.

The correction module is configured for adjusting phases of voltage and current input to the voltage converters to obtain an input voltage and input current which have the same phases.

Optionally, in this embodiment, the correction module may be a Power Factor Correction (PFC) module, configured for adjusting the phases of the input current and the input voltage to be the same, so as to prevent harmonic pollutions to the power grid.

Figure 4:
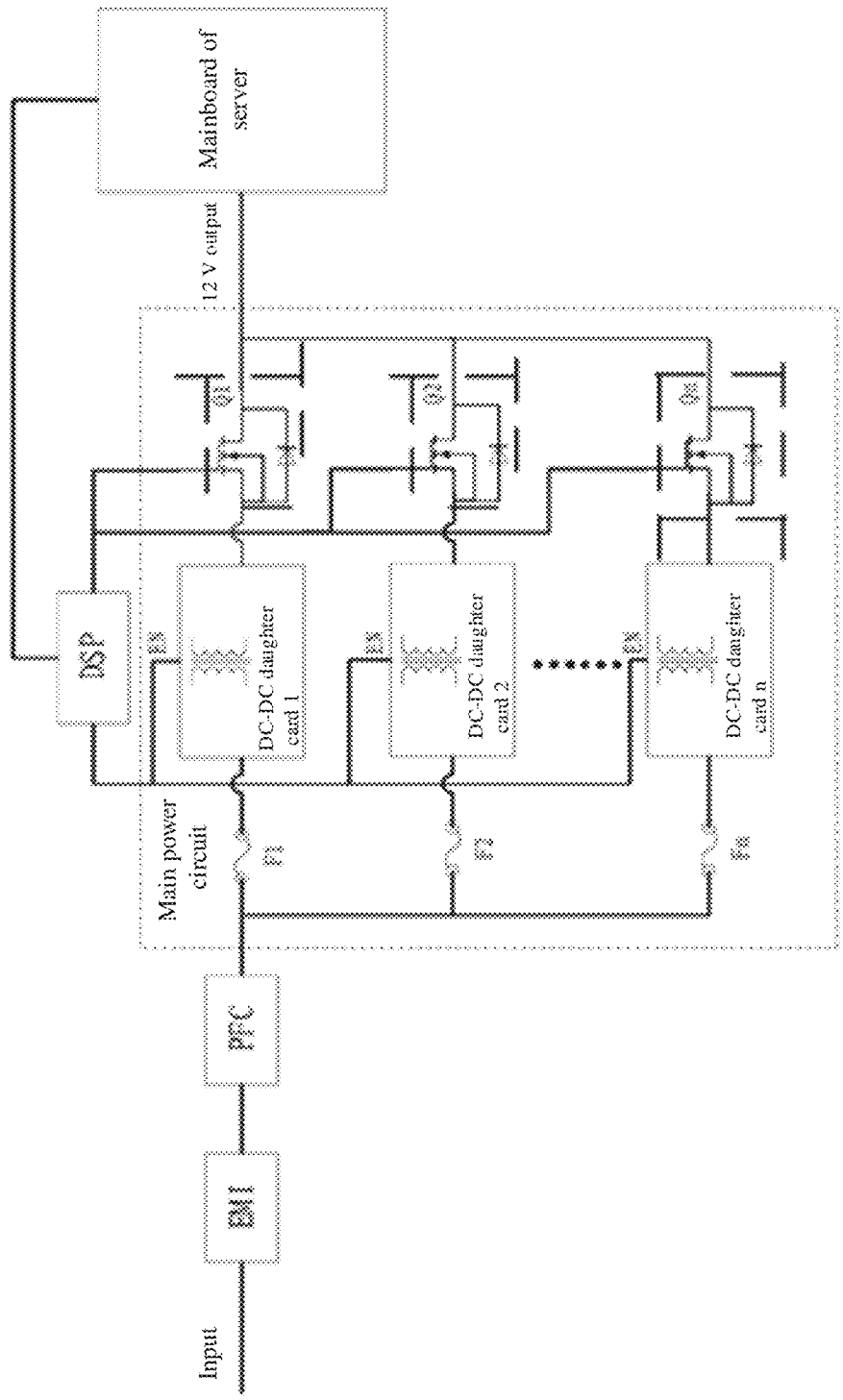
FIG. 4 is a schematic diagram of an optional power support unit according to an embodiment of the present application.

FIG. 4 is a schematic diagram of an optional power support unit according to an embodiment of the present application. As shown in FIG. 4, the Power support unit (PSU) includes a plurality of modules such as a main power circuit, Digital Signal Process (DSP) (corresponding to the processing chip mentioned above), Electromagnetic Interference (EMI) (corresponding to the filter mentioned above), and Power Factor Correction (PFC) (corresponding to the correction module mentioned above). A voltage input by a power supply first passes through the EMI to prevent high-frequency noise from the power supply from affecting a power grid, and then enters the PFC to adjust phases of an input current and an input voltage to be the same, to prevent harmonic pollutions to the power grid. The corrected voltage is converted by the main power circuit into a voltage that can be input to a server (e.g. if the server requires a 12 V voltage, the 12 V voltage is output to the server). The DSP is connected to both the server and the main power circuit separately to obtain a target power supply power of the server, thereby controlling the main power circuit to output electric energy with the target power supply power to the server.

The main power circuit in the above embodiment at least includes a plurality of voltage converters. The plurality of voltage converters are connected in parallel. The voltage converters can be Direct Current-Direct Current (DC-DC) daughter cards. The voltage converters can convert a voltage input by the power supply into a voltage (e.g. the 12V voltage input to the server) that can be used by the server. The DSP is connected to enable ends of the plurality of voltage converters respectively through a first port (such as an I/O output port). Furthermore, the DSP can control the operation of each voltage converter by outputting an enable signal to the voltage converter, thereby controlling the voltage converter to output the voltage to the server. Furthermore, from the plurality of voltage converters deployed in the power support unit according to the target power supply power required by the server, the DSP can further select the target voltage converters configured for supplying power to the server. After selecting the target voltage converters from the plurality of voltage converters, voltage converters among the plurality of voltage converters except the target voltage converters are determined as candidate voltage converters. When a target voltage converter fails, a candidate voltage converter can replace the failed target voltage converter to supply power to the server. Namely, the plurality of voltage converters deployed in the power support unit are redundant with each other.

In the above embodiment, field effect transistors (Q1, Q2 to Qn in FIG. 4) are further connected between the various voltage converters and the server. Sources of the field effect transistors are connected to the corresponding voltage converters; drains of the field effect transistors are connected to the server; and gates of the field effect transistors are connected to a second port (e.g. an I/O output port) of the processing chip. Thus, the DSP can control connection states between the voltage converters and the server through the field effect transistors, effectively preventing the mutual impact on outputs of different voltage converters. Meanwhile, the field effect transistors can be controlled to be turned on and turned off through the DSP, to further achieve precise control on the number of voltage converters that operate. Meanwhile, if the DSP controller cannot control a field effect transistor to be turned off because of any damage to the enable end of the corresponding voltage converter, the field effect transistor corresponding to the voltage converter can be controlled to be turned off, to prevent the impact of the damaged voltage converter on other normal voltage converters. This can further improve the safety and stability of the system.

In the above embodiment, fuses (F1, F2 to Fn in FIG. 4) can be further arranged between the voltage converters and the power supply. The fuses are connected between the PFC and the voltage converters, and are arranged in a manner of corresponding to the voltage converters. The characteristic of the fuse is to achieve quickly fuse a fuse wire. The purpose is that: When a voltage converter is damaged due to any short circuit failure, the corresponding fuse needs to be quickly fused to avoid the impact on the normal operation of other voltage converters, thereby achieving isolation and protection on other voltage converters.

Through the above embodiment, according to the mode where the plurality of DC-DCs are redundant and backup each other, the redundancy cost is reduced, the extensibility of a single PSU is improved, and the cost of PSU maintenance in a data center in the later stage is reduced.

According to the descriptions in the foregoing implementations, a person skilled in the art may clearly learn that the method according to the foregoing embodiments may be implemented by relying on software and an essential commodity hardware platform or by using hardware, but the former is a better implementation in most cases. Based on such an understanding, the technical solutions of present application essentially, or the part contributing to the prior art, may be presented in the form of a software product. The computer software product is stored in a non-volatile readable storage medium (e.g. a read only memory/random access memory (ROM/RAM), a magnetic disk, or a compact disc) including several instructions to enable a terminal device (which may be a mobile phone, a computer, a server, a network device, or the like) to perform the methods described in all the embodiments of present application.

This embodiment further provides a power supply apparatus for a server. The apparatus is configured for implementing the above embodiments and preferred implementations. Those contents that have been described will not be elaborated. As used below, the term "module" can be a combination of software and/or hardware that implements a predetermined function. Although the apparatus described in the following embodiments is preferably implemented in software, the implementation of hardware or a combination of software and hardware is also possible and envisioned.

Figure 5:
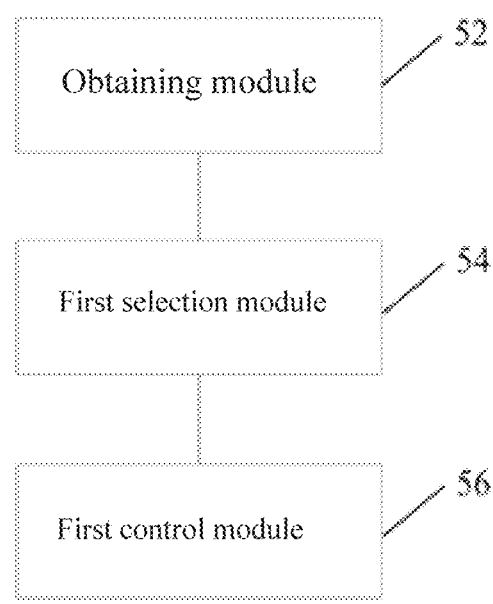
FIG. 5 is a structural block diagram of a power supply control apparatus for a server according to an embodiment of the present application.

FIG. 5 is a structural block diagram of a power supply control apparatus for a server according to an embodiment of the present application. As shown in FIG. 5, the apparatus includes: an obtaining module 52, configured for obtaining a target power supply power of a server to be powered; a first selection module 54, configured for selecting, from a plurality of voltage converters deployed in a power support unit, one or more target voltage converters matched with the target power supply power, wherein the plurality of voltage converters in the power support unit are deployed in parallel; the power support unit is connected between a power supply of the server and the server; and a first control module 56, configured for controlling the one or more target voltage converters to supply power to the server, wherein each target voltage converter is configured for converting a power supply voltage of the power supply into a power supply voltage of the server.

Through the above steps, the operating power of each target voltage converter is determined according to the target power conversion rate, whereby the number of the required target voltage converters can be determined according to the target power supply power and the operating power, thereby achieving the purpose of supplying power to the server through the target number of target voltage converters. The power conversion rate of each voltage converter is the target power conversion rate, thus ensuring the controllability of the power conversion rate of the power support unit while ensuring the demand for the server for the power supply power.

Optionally, the first selection module includes: an obtaining module, configured for obtaining a full-load power that is allowed to be output by each voltage converter; and a selection unit, configured for selecting, from the plurality of voltage converters according to the full-load powers, the one or more target voltage converters allowed to output the target power supply power, wherein a total power that is allowed to be output by the one or more target voltage converters is greater than or equal to the target power supply power.

Optionally, the selection unit is configured for: converting the full-load power into operating power according to a target power conversion rate, wherein the target power conversion rate is a power conversion rate needing to be achieved by each target voltage converter; calculating a target number according to the target power supply power and the operating power; and obtaining the target number of target voltage converters from the plurality of voltage converters.

Optionally, the selection unit is configured for: searching a target conversion rate corresponding the target power conversion rate from the power conversion rate and conversion ratio having a corresponding relationship; and determining a product of the full-load power and the target conversion ratio as the operating power.

Optionally, the selection unit is configured for: in a case that the target power conversion rate is a maximum conversion rate that the target voltage converter is allowed to achieve, determining a half-load power corresponding to the full-load power as the operating power.

Optionally, the selection unit is configured for: calculating a ratio of the target power supply power to the operating power; in a case that the ratio is an integer, determining the ratio as the target number; and in a case that the ratio is a non-integer, rounding the ratio up to an integer, and obtaining the target number.

Optionally, the first control module includes: a sending unit, configured for sending a target enable signal to the enable port of each target voltage converter, wherein the target enable signal is used for controlling the target voltage converter to operate; and a control unit, configured for controlling the switching device between each target voltage converter and the server to be closed.

Optionally, the control unit is configured for: controlling a field effect transistor between each target voltage converter and the server to be turned on, wherein the switching device includes the field effect transistor; and controlling a field effect transistor between each reference voltage converter and the server to be turned off, wherein the reference voltage converter is a voltage converter among the plurality of voltage converters except the one or more target voltage converters.

Optionally, the apparatus further includes: a detection module, configured for detecting an operating state of the target voltage converter after controlling the one or more target voltage converters to supply power to the server, wherein the operating state includes a normal operating state and an abnormal operating state; a second selection module, configured for: in a case of detecting that the target voltage converter is in the abnormal operating state, selecting a replacement voltage converter from candidate voltage converters, wherein the candidate voltage converters are voltage converters among the plurality of voltage converters except the target voltage converter; and a second control module, configured for: controlling the replacement voltage converter to supply power to the server, and controlling the target voltage converter in the abnormal operating state to stop operating.

Optionally, the obtaining module includes: an obtaining unit, configured for obtaining a service load of a target service to be executed by the server; and a prediction unit, configured for predicting the target power supply power of the server according to the service load.

Optionally, the prediction unit is configured for: inputting the service load to a target power prediction model, wherein the target power prediction model is obtained by training an initial power prediction model by using a power consumed by executing a reference service by the server, and the reference service includes the target service; and obtaining consumed power, which is output by the target power prediction model, as the target power supply power.

It should be noted that the above modules can be implemented through software or hardware. For the latter, the various modules can be implemented in the following ways, but not limited to: The above modules are all located in the same processor; or, the aforementioned modules can be located in different processors in the form of any combination.

The embodiments of the present application further provide a non-volatile computer-readable storage medium. The computer-readable storage medium has a computer program stored thereon, and the computer program is configured for, when run, executing the steps in any one of the above method embodiments.

In an exemplary embodiment, the non-volatile computer-readable storage medium mentioned above can include but not limited to: various media that can store computer programs, such as a USB flash drive, a ROM, a RAM, a mobile hard disk drive, a magnetic disk, and a compact disc.

The embodiments of the present application further provide an electronic device, including a memory and a processor. The memory has a computer program stored thereon. The processor is configured for running the computer program to execute the steps in any one of the above method embodiments.

In an exemplary embodiment, the aforementioned electronic device may further include a transmission device and an input/output device, wherein the transmission device is connected to the above processor, and the input/output device is connected to the above processor.

The specific examples in this embodiment can refer to the examples described in the above embodiments and exemplary implementations, and will not be elaborated in this embodiment.

Obviously, those skilled in the art should understand that the various modules or steps of the present application can be implemented using a universal computing apparatus, which can be concentrated on a single computing apparatus or distributed on a network composed of a plurality of computing apparatuses. The modules or steps can be implemented using program codes that can be executed by a computing apparatus, whereby the modules or steps can be stored in a storage apparatus for execution by the computing apparatus. Furthermore, in some cases, the steps shown or described can be executed in an order different from those here, or the steps can be separately made into various integrated circuit modules, or a plurality of modules or steps among the modules or steps can be made into single integrated circuit modules for implementation. In this way, the present application is not limited to any specific combinations of hardware and software.

The above descriptions are only preferred embodiments of the present application, and are not intended to limit the present application. For those skilled in the art, the present application may have various modifications and changes. Any modification, equivalent replacement, and improvement made within the principles of the present application shall fall within the protection scope of the present application.

What is claimed is:

1. A power supply control method for a server, comprising:
    obtaining a target power supply power of a server to be powered;
    selecting one or more target voltage converters matched with the target power supply power from a plurality of voltage converters deployed in a power support unit, wherein the plurality of voltage converters in the power support unit are deployed in parallel, and the power support unit is connected between a power supply of the server and the server; and
    controlling the one or more target voltage converters to supply power to the server, wherein each target voltage converter is configured for converting a power supply voltage of the power supply into a power supply voltage of the server;
    wherein the selecting one or more target voltage converters matched with the target power supply power from a plurality of voltage converters deployed in a power support unit comprises:
        obtaining a full-load power that is allowed to be output by each voltage converter; and
        selecting the one or more target voltage converters allowed to output the target power supply power from the plurality of voltage converters according to the full-load powers, wherein a total power that is allowed to be output by the one or more target voltage converters is greater than or equal to the target power supply power; and
    wherein the selecting the one or more target voltage converters allowed to output the target power supply power from the plurality of voltage converters according to the full-load powers comprises:
        converting the full-load power into operating power according to a target power conversion rate, wherein the target power conversion rate is a power conversion rate needing to be achieved by each target voltage converter, the power conversion rate is used for indicating an efficiency of converting, by the voltage converter, electric energy input to the voltage converter into electric energy input to the server;
        calculating a target number according to the target power supply power and the operating power; and
        obtaining the target number of target voltage converters from the plurality of voltage converters.

2. The method according to claim 1, wherein the converting the full-load power into operating power according to a target power conversion rate comprises:
    searching power conversion rates and conversion ratios having correspondence relationships with the power conversion rates for a target conversion ratio corresponding to the target power conversion rate; and
    determining a product of the full-load power and the target conversion ratio as the operating power.

3. The method according to claim 1, wherein the converting the full-load power into operating power according to a target power conversion rate comprises:
    in a case that the target power conversion rate is a maximum conversion rate that the target voltage converter is allowed to achieve, determining a half-load power corresponding to the full-load power as the operating power.

4. The method according to claim 1, wherein the calculating a target number according to the target power supply power and the operating power comprises:
    calculating a ratio of the target power supply power to the operating power;
    in a case that the ratio is an integer, determining the ratio as the target number; and
    in a case that the ratio is a non-integer, rounding the ratio up to an integer, and obtaining the target number.

5. The method according to claim 1, wherein the controlling the one or more target voltage converters to supply power to the server comprises:
    sending a target enable signal to each target voltage converter, wherein the target enable signal is used for controlling the target voltage converter to operate; and
    controlling a switching device between each target voltage converter and the server to be closed.

6. The method according to claim 5, wherein the controlling a switching device between each target voltage converter and the server to be closed comprises:
    controlling a field effect transistor between each target voltage converter and the server to be turned on, wherein the switching device comprises the field effect transistor; and
    controlling a second field effect transistor between each reference voltage converter and the server to be turned off, wherein the reference voltage converter is a voltage converter among the plurality of voltage converters except the one or more target voltage converters.

7. The method according to claim 1, wherein after the controlling the one or more target voltage converters to supply power to the server, the method further comprises:
    detecting an operating state of the target voltage converter, wherein the operating state comprises a normal operating state and an abnormal operating state;
    in a case of detecting that the target voltage converter is in the abnormal operating state, selecting a replacement voltage converter from candidate voltage converters, wherein the candidate voltage converters are the voltage converters among the plurality of voltage converters except the target voltage converter; and
    controlling the replacement voltage converter to supply power to the server, and controlling the target voltage converter in the abnormal operating state to stop operating.

8. The method according to claim 1, wherein the obtaining a target power supply power of a server to be powered comprises:

obtaining a service load of a target service to be executed by the server; and predicting the target power supply power of the server according to the service load.

9. The method according to claim 8, wherein the predicting the target power supply power of the server according to the service load comprises:

inputting the service load to a target power prediction model, wherein the target power prediction model is obtained by training an initial power prediction model by using a power consumed by executing a reference service by the server, and the reference service comprises the target service; and obtaining consumed power, which is output by the target power prediction model, as the target power supply power.

10. A power support unit of a server, comprising: a plurality of voltage converters and a processing chip, wherein the plurality of voltage converters are deployed in parallel; the processing chip is connected to each voltage converter; the power support unit is connected between a power supply of a server to be powered and the server;

the processing chip is configured for: obtaining a target power supply power of the server; selecting one or more target voltage converters matched with the target power supply power from the plurality of voltage converters; and controlling the one or more target voltage converters to supply power to the server;

each target voltage converter is configured for converting a power supply voltage of the power supply into a power supply voltage of the server;

the selecting one or more target voltage converters matched with the target power supply power from the plurality of voltage converters comprises:

obtaining a full-load power that is allowed to be output by each voltage converter; and selecting the one or more target voltage converters allowed to output the target power supply power from the plurality of voltage converters according to the full-load powers, wherein a total power that is allowed to be output by the one or more target voltage converters is greater than or equal to the target power supply power;

the selecting the one or more target voltage converters allowed to output the target power supply power from the plurality of voltage converters according to the full-load powers comprises:

converting the full-load power into operating power according to a target power conversion rate, wherein the target power conversion rate is a power conversion rate needing to be achieved by each target voltage converter, the power conversion rate is used for indicating an efficiency of converting, by the voltage converter, electric energy input to the voltage converter into electric energy input to the server;

calculating a target number according to the target power supply power and the operating power; and obtaining the target number of target voltage converters from the plurality of voltage converters.

11. The power support unit according to claim 10, wherein the processing chip is connected to an enable port of each voltage converter; each target voltage converter is connected to the server through a switching device; the processing chip is connected to each switching device separately; and the processing chip is configured for: sending a target enable signal to the enable port of each target voltage converter, wherein the target enable signal is used for controlling the target voltage converter to operate; and controlling the switching device between each target voltage converter and the server to be closed.

12. The power support unit according to claim 10, wherein a target power prediction model is further deployed in the processing chip; and the processing chip is configured for: obtaining a service load of a target service to be executed by the server; inputting the service load to the target power prediction model, wherein the target power prediction model is obtained by training an initial power prediction model by using a power consumed by executing a reference service by the server, and the reference service comprises the target service; and obtaining consumed power, which is output by the target power prediction model, as the target power supply power.

13. The power support unit according to claim 10, wherein the power support unit further comprises: a plurality of fuses, wherein the plurality of fuses are arranged in a manner of corresponding to the plurality of voltage converters; first ends of the plurality of fuses are connected to the power supply, and second ends of the plurality of fuses are connected to input ends of the plurality of voltage converters; and the plurality of fuses are configured for cutting off a connection between the power supply and the plurality of voltage converters in a case that a broken circuit fault occurs in the plurality of voltage converters.

14. The power support unit according to claim 10, wherein the power support unit further comprises: a filtering module, wherein a first end of the filtering module is connected to the power supply, and a second end of the filtering module is connected to input ends of the plurality of voltage converters; and the filtering module is configured for filtering out noise output by the power supply.

15. The power support unit according to claim 10, wherein the power support unit further comprises: a correction module, wherein a first end of the correction module is connected to the power supply, and a second end of the correction module is connected to input ends of the plurality of voltage converters; and the correction module is configured for adjusting phases of voltage and current input to the plurality of voltage converters to obtain an input voltage and input current which have the same phases.

16. An electronic device, comprising a memory, a processor, and a computer program stored on the memory and runnable on the processor, the processor, when running the computer program, implements steps of a power supply control method for a server, comprising:

obtaining a target power supply power of a server to be powered;

selecting one or more target voltage converters matched with the target power supply power from a plurality of voltage converters deployed in a power support unit, wherein the plurality of voltage converters in the power support unit are deployed in parallel, and the power support unit is connected between a power supply of the server and the server; and controlling the one or more target voltage converters to supply power to the server, wherein each target voltage converter is configured for converting a power supply voltage of the power supply into a power supply voltage of the server;

wherein the selecting one or more target voltage converters matched with the target power supply power from a plurality of voltage converters deployed in a power support unit comprises:

obtaining a full-load power that is allowed to be output by each voltage converter; and selecting the one or more target voltage converters allowed to output the target power supply power from the plurality of voltage converters according to the full-load powers, wherein a total power that is allowed to be output by the one or more target voltage converters is greater than or equal to the target power supply power; and wherein the selecting the one or more target voltage converters allowed to output the target power supply power from the plurality of voltage converters according to the full-load powers comprises:

converting the full-load power into operating power according to a target power conversion rate, wherein the target power conversion rate is a power conversion rate needing to be achieved by each target voltage converter, the power conversion rate is used for indicating an efficiency of converting, by the voltage converter, electric energy input to the voltage converter into electric energy input to the server;

calculating a target number according to the target power supply power and the operating power; and obtaining the target number of target voltage converters from the plurality of voltage converters.

17. The electronic device according to claim 16, wherein upon execution of the computer program by the processor, the processor is further configured to:

search power conversion rates and conversion ratios having correspondence relationships with the power conversion rates for a target conversion ratio corresponding to the target power conversion rate; and determine a product of the full-load power and the target conversion ratio as the operating power.

18. The electronic device according to claim 16, wherein execution of the computer program by the processor, the processor is further configured to:

in a case that the target power conversion rate is a maximum conversion rate that the target voltage converter is allowed to achieve, determine a half-load power corresponding to the full-load power as the operating power.

19. The electronic device according to claim 16, wherein upon execution of the computer program by the processor, the processor is further configured to:

calculate a ratio of the target power supply power to the operating power;

in a case that the ratio is an integer, determine the ratio as the target number; and in a case that the ratio is a non-integer, round the ratio up to an integer, and obtain the target number.

20. The electronic device according to claim 16, wherein execution of the computer program by the processor, the processor is further configured to:

send a target enable signal to each target voltage converter, wherein the target enable signal is used for controlling the target voltage converter to operate; and control a switching device between each target voltage converter and the server to be closed.

* * * * *